(12) United States Patent
Bogue

(10) Patent No.: US 7,841,251 B2
(45) Date of Patent: Nov. 30, 2010

(54) ANTIBACK-LASH NUT

(75) Inventor: Michael Bogue, Amston, CT (US)

(73) Assignee: Tritex Corporation, Waterbury, CT (US)

( * ) Notice: Subject to any disclaimer, the term of this patent is extended or adjusted under 35 U.S.C. 154(b) by 25 days.

(21) Appl. No.: 11/664,229

(22) PCT Filed: Oct. 3, 2005

(86) PCT No.: PCT/US2005/034917

§ 371 (c)(1), (2), (4) Date: Mar. 30, 2007

(87) PCT Pub. No.: WO2006/039363

PCT Pub. Date: Apr. 13, 2006

(65) Prior Publication Data
US 2007/0258789 A1     Nov. 8, 2007

(51) Int. Cl.
*F16H 25/20* (2006.01)

(52) U.S. Cl. ...................................................... 74/89.42

(58) Field of Classification Search ............... 74/441, 74/424.86, 440, 89.42, 409
See application file for complete search history.

(56) References Cited

U.S. PATENT DOCUMENTS

| | | | |
|---|---|---|---|
| 1,966,780 A * | 7/1934 | Wynrick | 411/536 |
| 2,715,341 A | 8/1955 | Hogan | |
| 2,842,978 A * | 7/1958 | Orner | 74/424.86 |
| 2,919,596 A | 1/1960 | Kuehl | |
| 3,186,249 A | 6/1965 | Lanzenberger | |
| 3,372,605 A * | 3/1968 | Orner | 74/89.42 |
| 3,720,116 A | 3/1973 | Better et al. | |
| 3,733,940 A | 5/1973 | Harman et al. | |
| 4,131,031 A | 12/1978 | Erikson et al. | |
| 4,249,426 A | 2/1981 | Erikson et al. | |
| 4,353,264 A | 10/1982 | Erikson et al. | |
| 4,433,590 A | 2/1984 | Benoit et al. | |
| 4,643,041 A | 2/1987 | Benton | |
| 4,679,457 A | 7/1987 | Nishikawa et al. | |
| 4,753,122 A | 6/1988 | Nishikawa et al. | |
| 5,027,671 A * | 7/1991 | Erikson et al. | 74/441 |
| 5,533,417 A * | 7/1996 | Devenyi | 74/424.94 |
| 5,732,596 A | 3/1998 | Erikson et al. | |
| 5,839,321 A | 11/1998 | Siemons | |
| 6,041,671 A | 3/2000 | Erikson et al. | |
| 6,119,541 A * | 9/2000 | Robinson | 74/441 |
| 6,142,032 A | 11/2000 | Creager | |
| 6,240,798 B1 | 6/2001 | Erikson et al. | |
| 6,467,362 B2 * | 10/2002 | Erikson et al. | 74/89.36 |

FOREIGN PATENT DOCUMENTS

WO    WO 9110849 A1 *   7/1991

* cited by examiner

*Primary Examiner*—Richard W Ridley
*Assistant Examiner*—Alan B Waits
(74) *Attorney, Agent, or Firm*—Carmody & Torrance LLP

(57) ABSTRACT

In a preferred embodiment, an apparatus, including: a first nut half (40) and a second nut half (42) each having internal threads (50, 52) complementary with threads on a screw inserted therein; the first nut half (40) and the second nut half (42) having first and second tapers (60, 62), respectively, defined therearound in adjacent surfaces thereof on proximal portions of the first nut half (40) and the second nut half (42); an annular retaining ring (80, 200, 220) having complementary third (92) and fourth (94) tapers defined therearound, with the first taper (60) engaging the third taper (92) and the second taper (62) engaging the fourth taper (94); and biasing apparatus (110, 180, 266) forcing the annular retaining ring (80, 200, 220) inwardly, thus eliminating backlash.

10 Claims, 5 Drawing Sheets

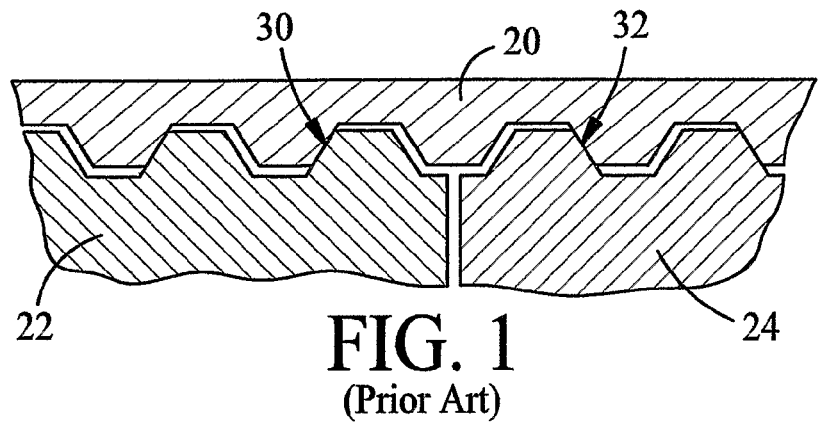
FIG. 1
(Prior Art)
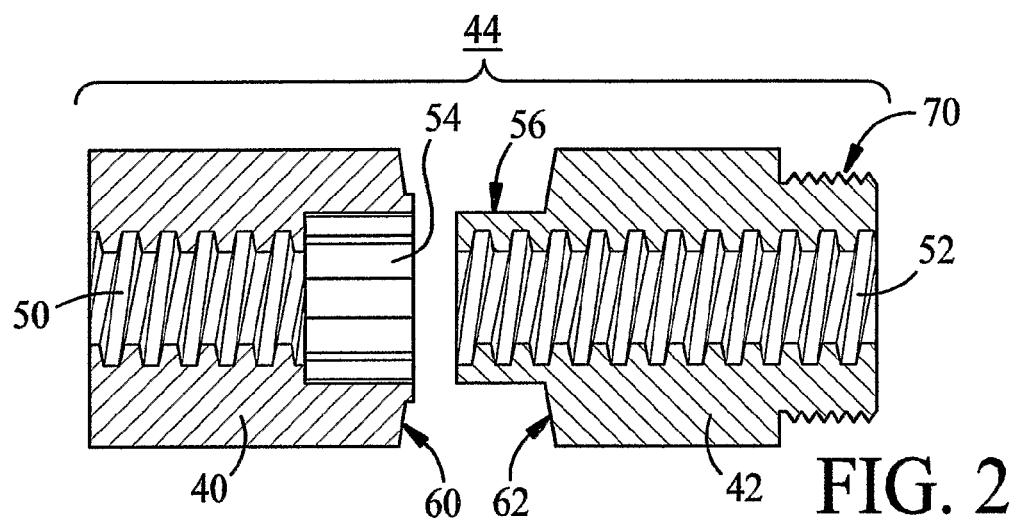
FIG. 2
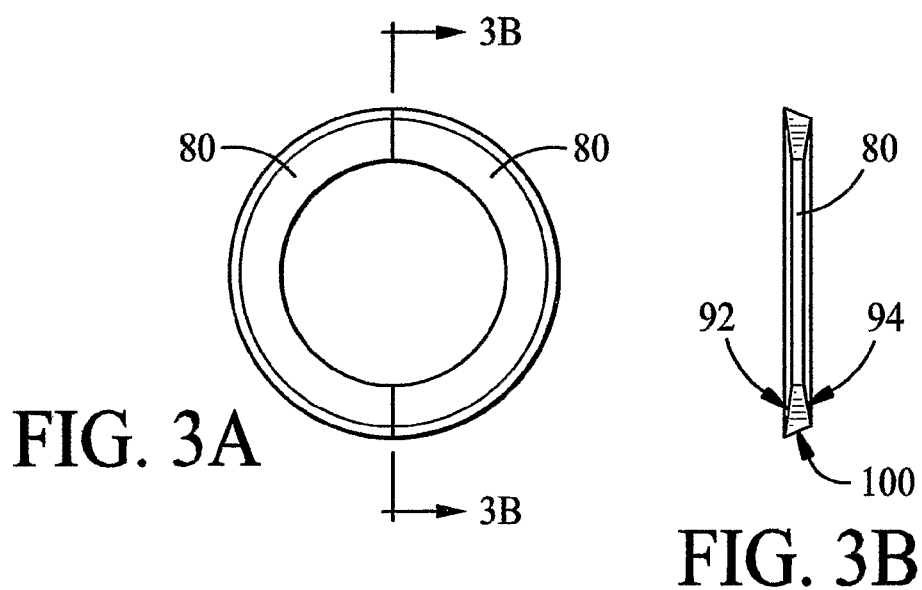
FIG. 3A
FIG. 3B

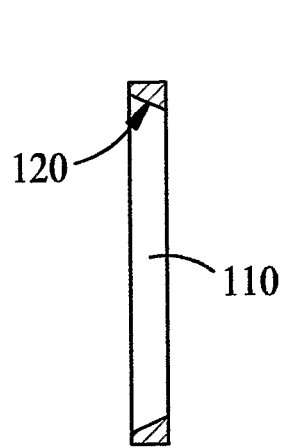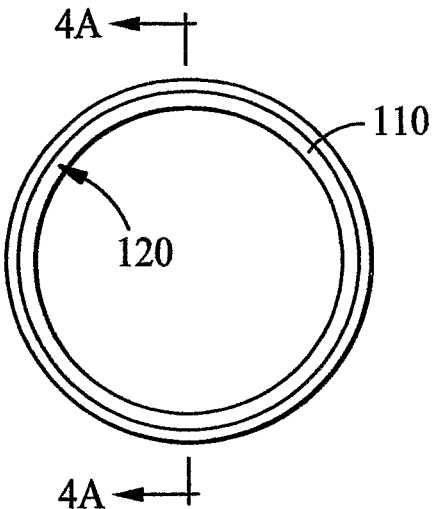
FIG. 4A    FIG. 4B
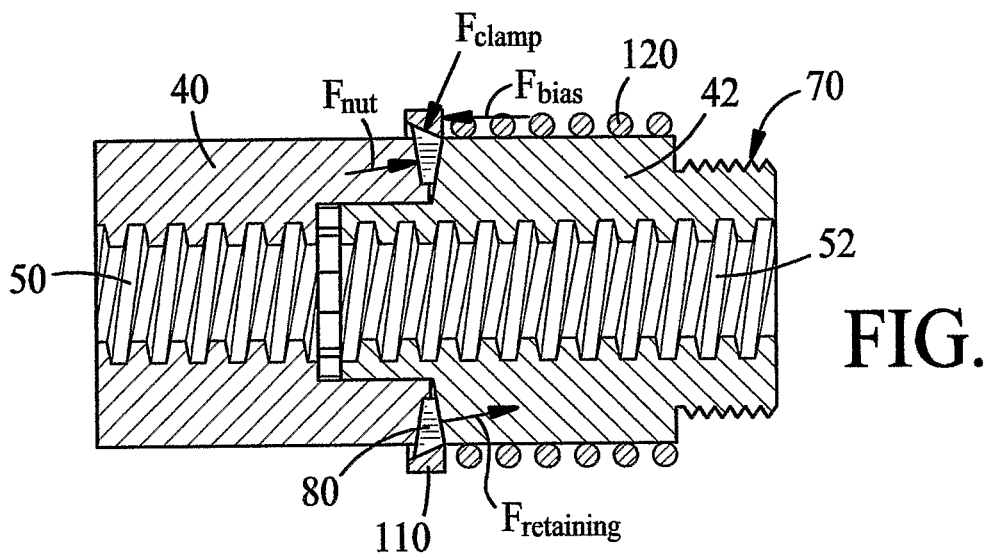
FIG. 5
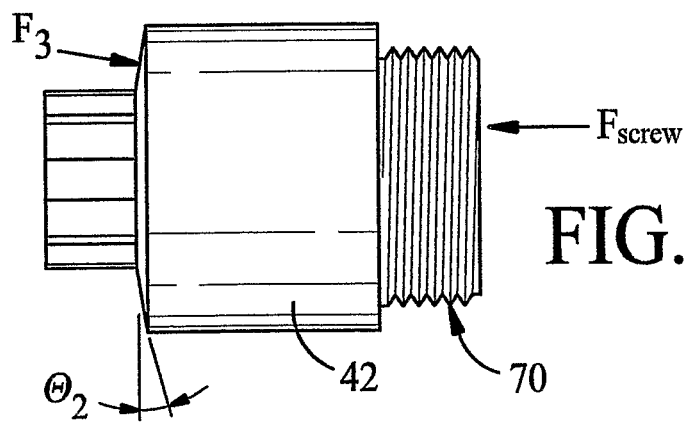
FIG. 6

ANTIBACK-LASH NUT

TECHNICAL FIELD

The present invention relates to an anti-backlash nuts generally and, more particularly, to such an anti-backlash nut with improved features.

BACKGROUND ART

Between any screw and nut interface there is a clearance due to the tolerances of the parts. This clearance can cause axial play between the screw and the nut. In some applications, the axial play may cause problems if a high degree of precision positioning is required.

An anti-backlash nut is used to eliminate axial play and increase the positional accuracy of the screw/nut interface. An anti-backlash nut eliminates axial play or backlash, by loading both flanks of the screw.

There are currently several methods for providing anti-backlash nuts. First of all, there is the collet style of anti backlash nut. This type of nut uses an internally treaded cylinder with three slots cut into it to create three "fingers". At the end of the cylinder, there is a ramp. A spring-loaded ring is pressed up the ramp which causes the fingers to close and fill the clearance between the screw and nut. This method provides a high axial stiffness, but the fingers may flex and cause lost rotational motion.

Another anti-backlash nut comprises two nuts that are keyed together to prevent rotation and allow axial movement. A compression spring is placed between the nuts which forces them apart and eliminates backlash. This design very simple and low cost, but it provides an axial stiffness only equal to the spring force applied. Also, it does not provide a complete thread due to the slots cut into it.

A third type of anti-backlash nut also has two nuts that are keyed together to prevent rotation and allow axial motion. A torsional spring is placed between one of the nut halves and a sleeve is placed over both nuts. One end of the sleeve is flat, while the other has a ramp of thread, One of the nut halves also has a ramp to mate with the sleeve. When the torsional spring is wound, the sleeve rotates and the ramp forces the two nut halves apart, eliminating backlash. This design provides a high axial stiffness, but may also bind if exposed to vibration or high acceleration.

The final type of anti-backlash nut uses two nuts that are tightened against each other with an elastomeric washer, or ratcheting mechanism, to prevent rotation. This design does not compensate for wear and can tighten with high acceleration.

The current designs all have one of three drawbacks. Either the nuts have low axial stiffness, or for the nuts that have high axial stiffness, they have a tendency to tighten or loosen the anti-backlash if they hit a hard stop or experience high acceleration. The third drawback of the current designs with high axial stiffness is that if the nuts are run along the screw over a small stroke and then run to a different portion of the screw which has experienced no wear, the nuts will tighten causing the torque required to move them to drastically increase.

Accordingly, it is a principal object of the present invention to provide an anti-backlash nut that has high axial stiffness for use in high load applications.

It is a further object of the present invention to provide such an anti-backlash nut that has the ability to withstand high acceleration, vibrations, or hitting a hard stop without binding or loosening.

It is another object of the present invention to provide such an anti-backlash nut that has the ability to compensate for wear of the screw without a dramatic increase in drag torque.

It is an additional object of the present invention to provide such an anti-backlash nut that minimizes flexure of the nut.

It is yet a further object of the present invention to provide such an anti-backlash nut that minimizes cost.

It is yet another object of the present invention to provide such an anti-backlash nut that minimizes the number of parts used.

It is yet an additional object of the present invention to provide such an anti-backlash nut with a full thread (360 degrees) for long life.

Other objects of the invention, as well as particular features and advantages thereof, will be apparent or be elucidated in the following description and the accompanying drawing figures.

DISCLOSURE OF INVENTION

The present invention achieves the above objects, among others, by providing, in preferred embodiments, an apparatus, comprising: a first nut half and a second nut half each having internal threads complementary with threads on a screw inserted therein; said first nut half and said second nut half having first and second tapers, respectively, defined therearound in adjacent surfaces thereof on proximal portions of said first nut half and said second nut half; an annular retaining ring having complementary third and fourth tapers defined therearound, with said first taper engaging said third taper and said second taper engaging said fourth taper; and biasing means forcing said annular retaining ring inwardly, thus eliminating backlash.

BRIEF DESCRIPTION OF DRAWINGS

Understanding of the present invention and the various aspects thereof will be facilitated by reference to the accompanying drawing figures, submitted for purposes of illustration only and not intended to define the scope of the invention, on which:

FIG. 1 is a fragmentary, side elevational view, in cross-section, showing how an anti-backlash nut eliminates axial play.

FIG. 2 is a side elevational view, in cross-section, showing the two nut halves of one embodiment of the present invention.

FIGS. 3(A) and 3(B) are end elevational and side elevational taken along line "3(B)-3(B)" of FIG. 3(A) views, respectively, of a retaining ring according to the embodiment shown on FIG. 2.

FIGS. 4(A) and 4(B) are side elevational in cross-section taken along line "4(A)-4(A)" of FIG. 4(B) and side elevational views, respectively, of a clamping ring according to the embodiment shown on FIG. 2.

FIG. 5 is a side elevational view of an assembled anti-backlash nut, showing the forces applied to the nut, according to the embodiment shown on FIG. 2.

FIG. 6 is a diagram of the right hand portion of the embodiment shown on FIG. 2.

BEST MODE FOR CARRYING OUT THE INVENTION

Figure 7:
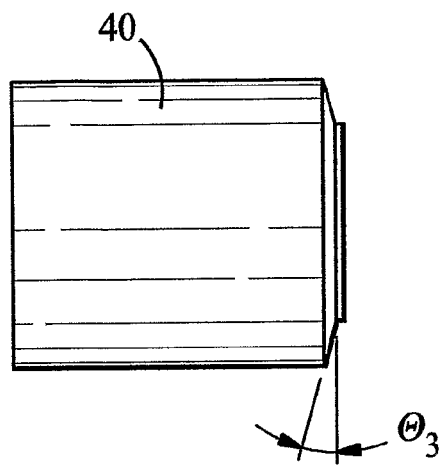
FIG. 7 is a diagram of the left hand portion of the embodiment shown on FIG. 2.
Figure 8:
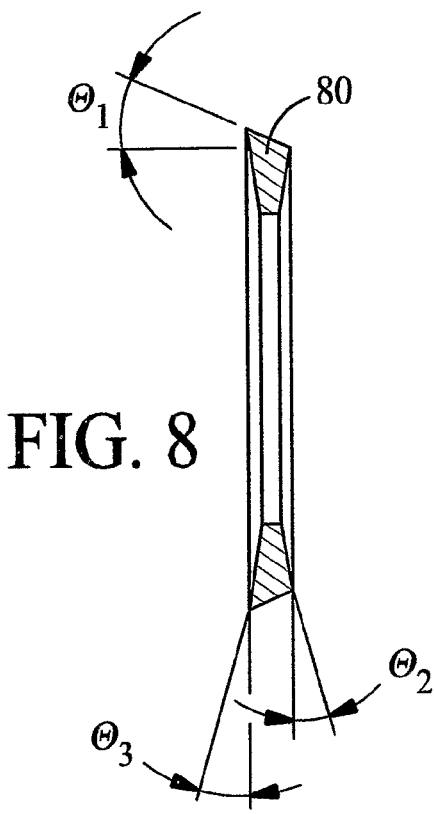
FIG. 8 is a diagram of a retaining ring of the embodiment shown on FIG. 2.
Figure 9A:
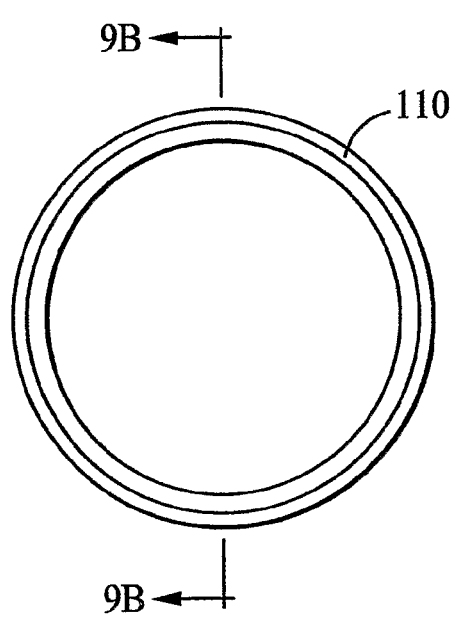
FIGS. 9(A) and 9(B) are end elevational and cross-sectional taken along line "9(13)-9(B)" of FIG. 9(A) views, respectively, of the clamping ring of the embodiment of FIG. 2.
Figure 9B:
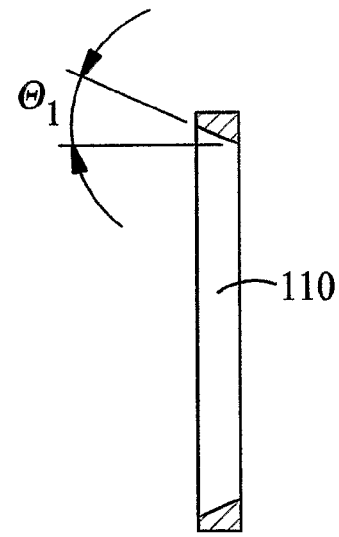

Reference should now be made to the drawing figures on which similar or identical elements are given consistent identifying numerals throughout the various figures thereof, and on which parenthetical references to figure numbers, when used, direct the reader to the figure(s) on which the element(s) being described is (are) most clearly seen, although that (those) element(s) may be shown on other drawing figures also.

FIG. 1 illustrates how an anti-backlash nut can eliminate axial play or backlash. Here, a screw 20 has threaded thereon two nut halves 22 and 24. Nut halves 22 and 24 are forced apart by conventional means not shown so that nut half 22 engages the left sides of the flanks of screw 20, as at 30, and nut half 24 engages the left sides of the flanks of the screw, as at 32, thus eliminating axial play or backlash. Forcing nut halves 22 and 24 together has the same effect.

FIG. 2 illustrates nut halves 40 and 42 of the present invention generally indicated by the reference numeral 44. Nut halves 40 and 42 have internally threaded portions 50 and 52, respectively, to receive a complementarily threaded screw 20 (not shown on FIG. 2) and have complementary keying features 54 and 56, respectively, on proximal ends thereof to prevent rotational motion between the nut halves. Tapers 60 and 62 are placed on the mating shoulders of nut halves 40 and 42, respectively. In assembly, nut halves 40 and 42 are placed together the closest keying features 54 and 56 will allow while at the same time permitting screw 20 (FIG. 1) to fully engage the nut halves. A externally threaded portion 70 is provided on right hand nut halve 42 to allow for different mounting flanges to be used, although other means of attachment or different mounting means can be employed as well.

FIGS. 3(A) and 3(B) illustrate one of two clamping rings used with the embodiment of FIG. 2, here, clamping ring 80. Referring to FIG. 3(B), it will be seen that clamping ring 80 has two inclined surfaces 92 and 94 which match tapers 60 and 62, respectively, on nut halves 40 and 42. Clamping ring 80 also has a tapered outer circumference 100.

FIGS. 4(A) and 4(B) illustrate a retaining ring 110 to be employed with the embodiment of FIG. 2. Referring to FIG. 4(A), retaining ring 110 has an internal taper which engages the tapered outer circumference 100 of clamping ring 80 (FIG. 3(B)), thus forcing the clamping ring inwardly.

FIG. 5 illustrates assembled elements of the embodiment shown on FIG. 2 and also illustrates biasing means 120 pressing against retaining ring 110 which, in turn, presses against clamping ring 80, forcing the clamping ring inwardly. Biasing means 120 is shown as a spring, but can be a suitable elastomeric member, or other biasing means. The distal end of biasing means 120 may be fixedly attached to nut half 42 or it may simply engage a mounting flange (not shown).

FIGS. 6-9 illustrate the various angles that may be employed in the embodiment of FIG. 2. Angles $\theta_1$-$\theta_3$ can be about fifteen degrees, about thirty seven degrees, and about thirty seven degrees when nut halves 40 and 42 and clamping ring 80 are constructed of lubricated polyacetals and retaining ring 110 is constructed of aluminum.

Figure 10:
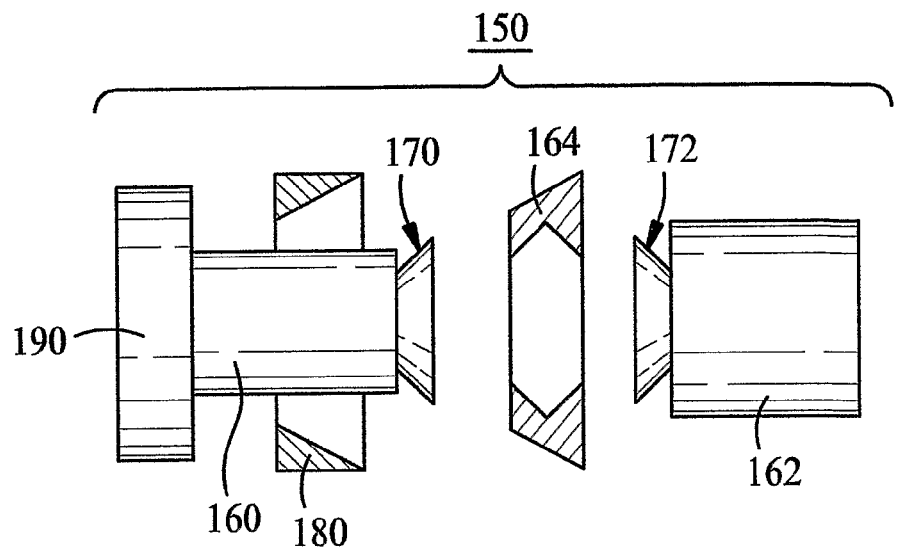
FIG. 10 is a side elevational view, partially in cross-section, of a further embodiment of the present invention.

FIG. 10 illustrates a further embodiment of the present invention, an anti-backlash nut generally indicated by the reference numeral 150. Anti-backlash nut 150 includes nut halves 160 and 162 and a retaining ring 164. The tapers 170 and 172 on nut halves 160 and 162 and the complementary tapers 174 and 176 on the retaining ring, respectively, have been reversed from the tapers of the similar members shown on FIG. 5. Thus, when a clamping ring or collet 180 is forced over retaining ring 164, nut halves 160 and 162 are forced together, causing the nut halves to be pressed toward each other, thus eliminating back-lash. This arrangement provides for easier installation/removal of nut halves 160 and 162 on/from the screw (not shown on FIG. 10). Again, the force moving collet 180 to the right on FIG. 10 comprises biasing means (not shown on FIG. 10). A mounting flange 190 is shown attached to the distal end of nut half 160.

Figure 11:
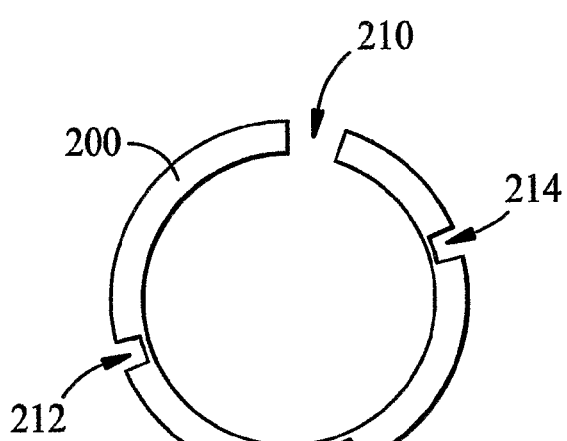
FIG. 11 is an end elevational view of another retaining ring design that can be used with the embodiment of FIG. 2.

FIG. 11 illustrates an alternative design for a retaining ring, indicated by the reference numeral 200 which has the same tapers as retaining ring 110 (FIG. 3). Retaining ring 200 employs a gap 210 and three notches 212, 214, and 216, spaced at approximately ninety degrees around retaining ring 200. Retaining ring 200 is a single ring and can be used with the embodiments shown on FIG. 5 or FIG. 10.

Figure 12:
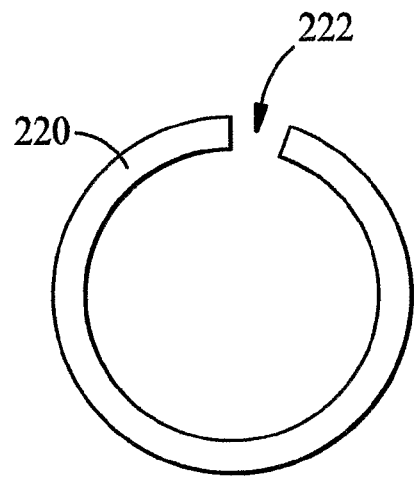
FIG. 12 is an end elevational view of an additional retaining ring that can be used with the embodiment of FIG. 2.

FIG. 12 illustrates another alternative design for a retaining ring, indicated by the reference numeral 220. This is the same as retaining ring 200 (FIG. 11), except that this retaining ring has only a gap 222 and relies on the force from clamping ring 110 (FIG. 5) or collet 180 to cause the retaining ring to flex.

Figure 13:
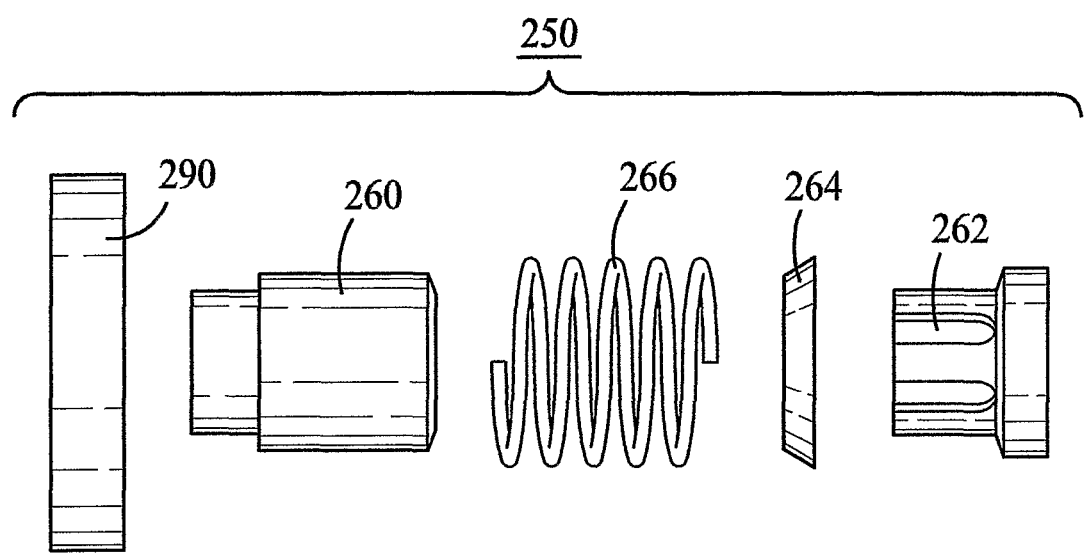
FIG. 13 is another embodiment of the present invention.

FIG. 13 illustrates another embodiment of the present invention, an anti-backlash nut generally indicated by the reference numeral 250. Anti-backlash nut 250 has two nut halves 260 and 262, a retaining ring 264, and biasing means 266, all having structures similar to like elements shown on FIG. 5. This design dispenses with clamping ring 110 (FIG. 5) and when biasing means 266 presses against retaining rings 264, the retaining ring closes, thus causing nut halves 260 and 262 to be forced apart, thus compensating for backlash. This further simplifies the design shown on FIG. 5. A mounting flange 290 may be attached to the distal end of nut half 260. Retaining rings 110 (FIG. 5), 200 (FIG. 11), or 220 (FIG. 12) can be employed with the design shown on FIG. 13.

In addition to the materials of construction mentioned above, the nut halves and retaining rings can preferably be constructed of lubricated polyphenyl sulfide.

In this design, all of the interface angles as well as the spring force can be varied in order to change the characteristics of the anti-backlash nut.

As any of the angles increase, the ability of the anti-backlash nut to compensate for wear increases, because it increases the radial force on the retainer, or the axial force on the clamping ring. As any of the angles are decreased, the axial stiffness of the anti-backlash nut is increased. Using this information, the anti-backlash nut can be designed to have a high axial stiffness and be able to compensate for wear of the screw without a significant increase in torque of the leadscrew.

If threads are placed on the clamping ring and a torsional spring is used it also allows for the preload to be adjusted while the nut is on the leadscrew.

Another advantage of this design is that there are a small number of easily made parts. This will cause the cost to be low.

This design, due to its backdriveability (the ability for the stiffness of the anti-backlash nut to change with increased load such as the load from a worn screw), is also capable of experiencing vibration without a significant increase in torque. If the anti-backlash nut experiences vibration, the stiffness of the nut can only increase to the point when the anti-backlash nut backdrives.

This design is also resistant to high acceleration and hitting a hard stop without increasing the stiffness significantly. This is due to the keying feature which will allow axial but not rotational motion.

This design also has a full thread with excellent torsional stiffness.

In the embodiments of the present invention described above, it will be recognized that individual elements and/or features thereof are not necessarily limited to a particular embodiment but, where applicable, are interchangeable and can be used in any selected embodiment even though such may not be specifically shown.

Spatially orienting terms such as "above", "below", "upper", "lower", "outer", "inwardly", "vertical", "horizontal", and the like, where used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction and/or method without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention that, as a matter of language, might be said to fall therebetween.

The invention claimed is:

1. An apparatus, comprising:
    (a) a first nut half and a second nut half each having internal threads complementary with threads on a screw inserted therein;
    (b) said first nut half and said second nut half having first and second tapers, respectively, defined therearound in facing alignment on adjacent proximal portions of said first nut half and said second nut half;
    (c) an annular retaining ring comprising complementary third and fourth tapers defined therearound, with said first taper engaging said third taper and said second taper engaging said fourth taper; wherein said annular retaining ring further comprises a fifth taper defined in an outer peripheral circumference thereof, said fifth taper extending across a width of the outer peripheral circumference of the annular retaining ring; and
    (d) biasing means capable of forcing said annular retaining ring inwardly, thus eliminating backlash,
    wherein said annular retaining ring is forced inwardly between the adjacent proximal portions of the first nut half and second nut half, whereby the annular retaining ring is intermediate the first nut half and the second nut half.

2. An apparatus, as defined in claim 1, wherein as the biasing means forces the annular retaining ring inwardly, the annular retaining ring forces apart said first nut half and said second nut half.

3. An apparatus, as defined in claim 1, wherein: said outer peripheral circumference of said annular retaining ring is engaged by a clamping ring which is biased by the biasing means to force said annular retaining ring inwardly, wherein said clamping ring comprises a sixth taper defined in an inner circumference thereof and extending across the width of the inner circumference of the clamping ring, and wherein said fifth taper defined in the outer peripheral circumference of the annular retaining ring mates with the sixth taper defined in the inner circumference of the clamping ring.

4. An apparatus, as defined in claim 3, wherein: said biasing means comprises a spring or an elastomeric means, and said biasing means forces said clamping ring over said annular retaining ring.

5. An apparatus, as defined in claim 1, wherein: said annular retaining ring is a split annular ring having a single gap formed therein and three notches arranged around an exterior of said annular ring, said single gap and said three notches being spaced approximately equidistant from each other.

6. An apparatus, as defined in claim 1, wherein: said annular retaining ring is a split annular ring having a single gap formed therein.

7. An apparatus, as defined in claim 1, further comprising: an anti-rotation feature in said first nut half and said second nut half.

8. An apparatus as defined in claim 7, wherein the anti-rotation feature comprises complementary keying features on proximal ends of said first nut half and said second nut half, wherein said complementary keying features allow axial but not rotational movement.

9. An apparatus, as defined in claim 1, wherein the internal threads in said first nut half and said second nut half are continuous three hundred sixty degree threads.

10. An apparatus, comprising:
    (a) a first nut half and a second nut half each having internal threads complementary with threads on a screw inserted therein;
    (b) said first nut half and said second nut half having first and second tapers, respectively, defined therearound in facing alignment on adjacent proximal portions of said first nut half and said second nut half;
    (c) an annular retaining ring having complementary third and fourth tapers defined therearound, with said first taper engaging said third taper and said second taper engaging said fourth taper, wherein said annular retaining ring is a split annular ring having a single gap formed therein and three notches arranged around an exterior of said annular ring, said single gap and said three notches being spaced approximately equidistant from each other; and
    (d) biasing means capable of forcing said annular retaining ring inwardly, thus eliminating backlash,
    wherein said annular retaining ring is forced inwardly between the adjacent proximal portions of the first nut half and second nut half, whereby the annular retaining ring is intermediate the first nut half and the second nut half.

* * * * *